US006031237A

United States Patent [19]

Fukui et al.

[11] Patent Number: 6,031,237

[45] Date of Patent: Feb. 29, 2000

[54] RADIATION IMAGE STORAGE PANEL

[75] Inventors: Shinichiro Fukui; Hideki Suzuki, both of Kanagawa, Japan

[73] Assignee: Fuji Photo Film Co., Ltd., Kanagawa, Japan

[21] Appl. No.: 08/991,251

[22] Filed: Dec. 16, 1997

[30] Foreign Application Priority Data

Dec. 16, 1996 [JP] Japan .................................... 8-353612

[51] Int. Cl.[7] .............................. G21K 4/00; G03B 42/02

[52] U.S. Cl. .................................... 250/484.4; 250/483.1; 430/603

[58] Field of Search .............................. 250/484.4, 483.1; 430/603

[56] References Cited

U.S. PATENT DOCUMENTS

| | | | |
|---|---|---|---|
| 4,180,740 | 12/1979 | Suys et al. | 250/483.1 |
| 4,960,689 | 10/1990 | Nishikawa et al. | 430/603 |
| 5,164,224 | 11/1992 | Kojima et al. | 250/484.4 |
| 5,641,968 | 6/1997 | Suzuki et al. . | |

*Primary Examiner*—Constantine Hannaher
*Assistant Examiner*—Andrew Israel
*Attorney, Agent, or Firm*—Birch, Stewart, Kolasch & Birch, LLP

[57] ABSTRACT

A radiation image storage panel has a phosphor layer comprising a stimulable phosphor and a binder, in which the binder is composed of a resin containing a thermo-plastic polyurethane elastomer and a radical scavenger. The panel shows excellent durability against both light and repeated conveying.

10 Claims, No Drawings

RADIATION IMAGE STORAGE PANEL

FIELD OF THE INVENTION

The present invention relates to a radiation image storage panel using a stimulable phosphor.

BACKGROUND OF THE INVENTION

A radiation image recording and reproducing method utilizing a stimulable phosphor described, for instance, in U.S. Pat. No. 4,239,968, is now practically employed. In the method, a radiation image storage panel comprising a stimulable phosphor (i.e., stimulable phosphor sheet) is employed, and the method comprises the steps of causing the stimulable phosphor of the panel to absorb radiation energy having passed through an object or having radiated from an object; sequentially exciting the stimulable phosphor with an electromagnetic wave such as visible light or infrared rays (hereinafter referred to as "stimulating rays") to release the radiation energy stored in the phosphor as light emission (i.e., stimulated emission); photoelectrically detecting the emitted light to obtain electric signals; and reproducing the radiation image of the object as a visible image from the electric signals.

In the radiation image recording and reproducing method, a radiation image is obtainable with a sufficient amount of information by applying a radiation to the object at a considerably smaller dose, as compared with a conventional radiography using a combination of a radiographic film and radiographic intensifying screen. Further, the radiation image recording and reproducing method using a stimulable phosphor is of great value especially when the method is employed for medical diagnosis.

The radiation image storage panel employed in the above-described method has a basic structure comprising a support and a stimulable phosphor layer provided on one surface of the support. However, if the phosphor layer is self-supporting, the support may be omitted. Further, a transparent film of polymer material is generally placed on the free surface (i.e., surface not facing the support) of the phosphor layer to keep the phosphor layer from chemical deterioration or physical shock.

The phosphor layer generally comprises a binder and a stimulable phosphor dispersed therein. The stimulable phosphor emits stimulated emission when excited with a stimulating ray after having been exposed to a radiation such as X-ray. Accordingly, the radiation having passed through an object or radiated from an object is absorbed by the phosphor layer of the panel in proportion to the applied radiation dose, and a radiation image of the object is produced in the panel in the from of a radiation energy-stored image. The radiation energy-stored image can be released as stimulated emission by sequentially irradiating the panel with stimulating rays. The stimulated emission is then photoelectrically detected to give electric signals, so as to reproduce a visible image from the electric signals.

The radiation image recording and reproducing method is very useful for obtaining a radiation image as a visible image as described hereinbefore. It is desired for the radiation image storage panel employed in the method to have a high sensitivity and provide an image of high quality (high sharpness, high graininess, etc.).

The sensitivity of the radiation image storage panel is essentially determined by the total amount of stimulated emission given by the stimulable phosphor contained therein, and the total emission amount varies depending upon not only the emission luminance of the phosphor but also the content (i.e., amount) of the phosphor in the phosphor layer. The large content of the phosphor also results in increase of absorption of a radiation such as X-rays, so that the panel shows an increased high sensitivity and provides an image of improved quality, especially an image of improved graininess. On the other hand, assuming that the content of the phosphor in the phosphor layer is kept at the same level, if the phosphor layer is densely packed with the phosphor, a panel using such phosphor layer provides an image of high sharpness, because such phosphor layer can be made thinner to reduce spread of stimulating rays caused by scattering in the phosphor layer.

U.S. Pat. No. 4,910,407 discloses a radiation image storage panel having a compressed phosphor layer provided on the support. Since the compressed phosphor layer is packed with the phosphor more densely than conventional phosphor layers, the panel disclosed in the publication gives an image of improved sharpness. However, in contrast, the obtained image is often rendered poor in view of graininess because the compression treatment destroys a part of the phosphor in the layer. In order to solve this problem, Japanese Patent Provisional Publication No. H2-278197 proposes a radiation image storage panel having a compressed phosphor layer containing a particular binder. In more detail, a thermoplastic elastomer having softening point or melting point of 30 to 150° C. is used as a binder of the phosphor layer, and the compression treatment is carried out at the temperature above the softening point or melting point. Since this compression treatment makes the phosphor densely packed in the phosphor layer without destroying, the panel gives an image of both high sharpness and high graininess. Further, Japanese Patent Provisional Publication No. H7-287098 proposes a radiation image storage panel having two phosphor layers comprising different binders of thermoplastic resin (for example, thermoplastic elastomers having different softening points).

In the radiation image recording and reproducing method, the radiation image storage panel is repeatedly used in the cyclic procedure comprising the steps of exposing to a radiation (for recording of a radiation image), irradiating with stimulating rays (for reading of the recorded image) and exposing to an erasing light (for erasing the remaining image). In an apparatus for this method, the panel is repeatedly transferred from one step to another step by means of conveying means such as belt and rolls. Such repeated conveying, however, is liable to cause some cracks in the phosphor layer especially when the panel has the above-described phosphor layer compressed under heating. Since the cracks are apt to scatter the radiation and/or stimulating rays, the panel having a cracked phosphor layer gives an image of poor quality. In order to solve this problem, U.S. Pat. No. 5,641,968 proposes a further improved radiation image storage panel. In the proposed panel, the binder of the phosphor layer comprises a thermoplastic elastomer (e.g., polyurethane elastomer) having an elastic modules of not more than 0.3 kgf/mm$^2$, as well as a softening point or melting point of 30 to 150° C.

As described above, thermoplastic polyurethane elastomer is known to have excellent properties as a material for the binder resin of the phosphor layer of the radiation image storage panel, especially for that of the phosphor layer compressed (after having been formed) under heating so as to be densely packed with the phosphor.

SUMMARY OF THE INVENTION

The inventors, however, have found that the above radiation image storage panel (namely, the panel having a phosphor layer comprising thermoplastic polyurethane elastomer, especially aromatic polyurethane elastomer, as a binder resin) has a relatively low light-resistance (i.e., durability against light). Therefore, the phosphor layer of the radiation image storage panel is liable to deteriorate after repeated uses, and consequently the quality of the reproduced image is apt to gradually lowers.

Accordingly, it is an object of the present invention to provide a radiation image storage panel having excellent durability. Particularly, it is an object of the invention to provide a radiation image storage panel having excellent durability (against both repeated conveying and light) enough to give an image of high quality even after the panel is repeatedly used for a long time in the cyclic procedure comprising the steps of exposing to a radiation, irradiating with stimulating rays so as to reproduce the image, exposing to an erasing light, and transferring among the steps in the apparatus.

The present invention resides in a radiation image storage panel having a phosphor layer comprising a stimulable phosphor and a binder, wherein said binder comprises a resin containing a thermoplastic polyurethane elastomer as a main component, and said phosphor layer contains a radical scavenger.

The radical scavenger preferably is a hindered phenol compound or a hindered amine compound. The amount of the radical scavenger preferably is in the range of 0.05 to 10 weight parts per 100 weight parts of the polyurethane resin.

In the case that the thermoplastic polyurethane elastomer is an aromatic polyurethane elastomer, the effect of the invention is more effectively observed. Further, if the molecular structure of the aromatic polyurethane elastomer contains a repeating unit derived from diphenylmethane diisocyanate, the invention is particularly advantageous. The thermoplastic polyurethane elastomer preferably employed in the invention has an elastic modules of not more than 0.3 $kgf/mm^2$ (more preferably, not more than 0.1 $kgf/mm^2$) and softening point of 30 to 150° C. (more preferably, 50 to 120° C.). The softening point in this specification means Vicat softening point, which is determined by measuring the temperature when a standard indenter (diameter: 1 mm) loaded with 1 kg weight penetrates into the sample to reach the depth of 1 mm from the surface. The amount of the thermoplastic polyurethane elastomer preferably is in the range of 30 to 100 weight % (more preferably 60 to 100 weight %) of the binder resin.

The invention is particularly suitable for the radiation image storage panel having the phosphor layer which was prepared by subjecting a formed (coated and dried) phosphor layer to compression treatment.

DETAILED DESCRIPTION OF THE INVENTION

The radiation image storage panel of the invention is now described in detail.

First, an explanation about the stimulable phosphor employable for the invention is given below.

The stimulable phosphor gives a stimulated emission when it is irradiated with stimulating rays after it is exposed to radiation. In the preferred radiation image storage panel, a stimulable phosphor giving a stimulated emission of a wavelength in the range of 300 to 500 nm when it is irradiated with stimulating rays of a wavelength in the range of 400 to 900 nm is employed. Examples of the preferred stimulable phosphors include divalent europium activated alkaline earth metal halide phosphors, cerium activated alkaline earth metal halide phosphors and cerium activated oxyhalide phosphors. Each of those stimulable phosphors favorably gives the stimulated emission of high luminance. However, the stimulable phosphors employable in the radiation image storage panel of the invention are not limited to the above-mentioned preferred stimulable phosphors. Any other phosphors can be also employed, provided that the phosphor gives stimulated emission when excited with stimulating rays after exposure to a radiation.

A coating dispersion for forming the phosphor layer is prepared in the following manner.

The stimulable phosphor and a binder are well mixed in an appropriate solvent to give a coating dispersion in which the phosphor particles are uniformly dispersed in the binder solution. The binder used for the invention comprises a resin containing a thermoplastic polyurethane elastomer as a main component in combination with a radical scavenger.

The binder resin may comprise only a single thermoplastic polyurethane elastomer or a combination of plural thermoplastic polyurethane elastomers. An aromatic polyurethane elastomer is preferably used as the thermoplastic polyurethane elastomer of the invention, and it is particularly preferred that the molecular structure of the aromatic polyurethane elastomer contain a repeating unit derived from diphenylmethane diisocyanate.

The thermoplastic polyurethane elastomer may be used in combination with other polymers (e.g., epoxy resin, acrylic resin and polyimide resin), under the condition that the amount of the thermoplastic polyurethane elastomer is in an amount of not less than 30 weight % of the total binder resin.

The phosphor layer of the invention is characterized by containing a radical scavenger (a radical trap agent) as well as the thermoplastic polyurethane elastomer. The radical scavenger is generally used in an amount of 0.05 to 10 weight parts (preferably 0.1 to 1 weight parts) per 100 weight parts of the thermoplastic polyurethane elastomer. As the radical scavengers, hindered phenol compounds or hindered amine compounds are preferably employed for the invention. Various hindered phenol compounds and hindered amine compounds employable as the radical scavenger are commercially available. Examples of such radical scavengers of hindered phenol compounds include ADK STAB A0-20, A0-30, A0-40, A0-50, A0-60, A0-70, A0-75, A0-80 and A0-330 (trade names; available from Adeka Argas Chemical CO., Ltd.). Examples of the radical scavenger of hindered amine compounds include Sanol LS-744, LS-770, LS-765 and LS-2626 (trade names; available from Sankyo CO., Ltd.); Mark LA-77, LA-57, LA-67, LA-62, LA-68 and LA-63 (trade names; available from Adeka Argas Chemical CO., Ltd.); Tinuvin 144, Tinuvin 622LD and Chimassorb 944FL (or LD) (trade names; available from Ciba-Geigy); Cyasorb UV3346 (trade names; available from American Cyanamid); and Spinuvex A-36 (trade names; available from Montedison).

Examples of the solvents employable for preparing the coating dispersion include lower alcohols such as methanol, ethanol, n-propanol and n-butanol; chlorinated hydrocarbons such as methylene chloride and ethylene chloride; ketones such as acetone, methyl ethyl ketone and methyl isobutyl ketone; esters of lower alcohols with lower aliphatic acids such as methyl acetate, ethyl acetate and butyl acetate; ethers such as dioxane, ethylene glycol monoethyl ether, ethylene glycol monomethyl ether and tetrahydrofuran; and mixtures of the above-mentioned compounds.

In the coating dispersion, the binder polymer and the stimulable phosphor are introduced generally at a ratio of 1:1 to 1:100 (binder:phosphor, by weight), preferably 1:8 to 1:40 (by weight). The ratio can be varied depending on the desired characteristics of the storage panel and natures of the binder polymers and phosphors.

The coating dispersion may contain a dispersing agent to assist the dispersibility of the phosphor particles therein, and also contain a variety of additives such as a plasticizer for increasing the bonding between the binder and the phosphor particles in the phosphor layer. Examples of the dispersing agents include phthalic acid, stearic acid, caproic acid and a hydrophobic surface active agent. Examples of the plasticizers include phosphates such as triphenyl phosphate, tricresyl phosphate and diphenyl phosphate; phthalates such as diethyl phthalate and dimethoxyethyl phthalate; glycolates such as ethylphthalyl ethyl glycolate and butylphthalyl butyl glycolate; and polyesters of polyethylene glycols with aliphatic dicarboxylic acids such as polyester of triethylene glycol with adipic acid and polyester of diethylene glycol with succinic acid.

The prepared coating dispersion containing the phosphor and the binder is coated uniformly on a temporary support to form a coated layer film. The coating can be performed by known coating means such as doctor blade, roll coater, and knife coater.

The temporary support can be optionally selected from the known sheet materials such as a glass plate, a metal plate and sheet materials employed for the support of conventional radiographic intensifying screen or radiation image storage panel. Examples of such known materials include films of plastic materials such as cellulose acetate, polyester, polyethylene terephthalate, polyamide, polyimide, cellulose triacetate, and polycarbonate; metal sheets such as aluminum foil and aluminum alloy foil; ordinary papers; baryta paper; resin-coated papers; pigment papers containing titanium dioxide or the like; papers sizes with polyvinyl alcohol or the like; and ceramic sheets such as sheets of alumina, zirconia, magnesia and titania.

After the dispersion is evenly coated on the temporary support and then dried to form a coated layer film (i.e., a phosphor sheet for the phosphor layer), the formed phosphor sheet is then peeled off from the temporary support. Preferably, the surface of the temporary support is beforehand coated with a releasing agent so that the phosphor sheet may be easily peeled off.

Thus prepared phosphor sheet is superposed on a permanent support. The permanent support can be optionally selected from the same sheet materials as those for the temporary support above-described.

Some of the known radiation image storage panels have various auxiliary layers: for instance, an adhesive layer which is formed of a polymer material such as gelatin or an acrylic resin on the support and which enhances strength between the support and the phosphor layer or increases sensitivity or image quality (e.g., sharpness and graininess) of the obtainable radiation image; a light-reflecting layer of a light reflecting material such as titanium dioxide; and a light-absorbing layer of a light-absorbing material such as carbon black. The radiation image storage panel of the invention may have one or more of such auxiliary layers.

Further, the support of the radiation image storage panel of the invention may have a great number of very small convexes or concaves on its surface. If the support is coated with one or more auxiliary layers, the convexes or concaves may be formed on these layers. The great number of very small convexes or concaves can improve sharpness of the radiation image reproduced by the use of the storage panel.

The prepared phosphor sheet is placed on the permanent support and then compressed at the temperature above the softening point (or melting point) of the polymer, so as to be fixed on the support.

Examples of the compressing apparatus for the compression treatment employable in the invention include known apparatus such as a calendar roll and a hot press. For instance, a compression treatment using a calendar roll is carried out by moving the phosphor sheet at a certain speed to pass through between two rollers heated at the temperature above the softening point (or melting point) of the polymer. The compressing apparatus employable for the invention is not restricted to them. Any other apparatus can be employed as far as it can compress the phosphor sheet under heating in the manner described above. The pressure in the compression treatment is generally not less than 50 kgw/cm$^2$, and preferably in the range of 200 to 700 kgw/cm$^2$. The temperature is preferably set to be 10 to 50° C. higher than the softening point (or melting point) of the polymer. In the case that a calendar roll is used, the temperatures of two rollers are preferably set at the same. The moving speed is preferably in the range of 0.1 to 5.0 m/min.

As described above, a transparent protective film is generally provided on the free surface (surface not facing the support) of the phosphor layer to keep the phosphor layer from chemical deterioration or physical shock. In the radiation image storage panel of the invention, it is preferred to provide such transparent protective film for the same purpose.

The transparent protective film can be provided by coating the surface of the phosphor layer with a solution of a transparent polymer such as a cellulose derivatives (e.g., cellulose acetate or nitrocellulose), a synthetic polymer (e.g., polymethyl methacrylate, polyvinyl butyral, polyvinyl formal, polycarbonate, polyvinyl acetate or vinyl chloride/vinyl acetate copolymer) and fluororesin (e.g., fluoroolefin-vinyl ether copolymer). Optionally, a crosslinking agent such as an isocyanate is employable. Alternatively, the transparent protective film can be provided by beforehand preparing a transparent sheet such as a glass sheet or a sheet of polymer (e.g., polyethylene terephthalate, polyethylene naphthalate, polyethylene, polyvinylidene chloride and polyamide), followed by placing and fixing it onto the phosphor layer with an appropriate adhesive agent. The transparent protective film generally has a thickness in the range of 0.1 to 20 $\mu$m.

One or more layers of constituting the radiation image storage panel can be so colored as to well absorb the stimulating rays and not to absorb the stimulated emission. Such coloring is effective to increase sharpness of the image obtained by the use of the storage panel. Otherwise, an independent colored layer can be placed in an appropriate position of the storage panel for the same purpose.

Examples embodying the present invention are given below, but those examples are by no means construed to restrict the invention.

EXAMPLE 1

Composition of the Phosphor Sheet (layer)

| | |
|---|---|
| Stimulable phosphor ($BaFBr_{0.85}I_{0.15}$:$Eu^{2+}$) | 200 g |
| Binder: Polyurethane elastomer (Kuramiron U-8165 (solid), product of Kuraray Co., Ltd.; Aromatic polyurethane having a repeating unit of dimethylphenylmethane diisocyanate; Vicat softening point: 69° C.) | 8.0 g |
| Anti-yellowing agent: Epoxy resin (EP 1001 (solid), product of Yuka Shell Epoxy Kabushiki Kaisha) | 2.0 g |
| Radical scavenger: Hindered amine compound (Mark LA-77, product of Adeka Argas Chemical CO., Ltd.) | 0.16 g |

The above composition was placed in tetrahydrofuran and dispersed by means of a propeller mixer to give a coating dispersion of a viscosity of 30 PS (at 25° C.) in which the ratio of binder to phosphor was 1/20. The coating dispersion was coated on a polyethylene terephthalate temporary support (thickness: 150 μm) having a silicon release coating. The coated layer was dried to give a stimulable phosphor sheet having a thickness of 150 μm.

Composition of the Undercoating Layer

| | | |
|---|---|---|
| Binder: | Soft acryiic resin (solid) | 90 g |
| | Nitrocellulose (solid) | 30 g |

The above composition was placed in methyl ethyl ketone and dispersed by means of a propeller mixer to give a coating dispersion for the undercoating layer of a viscosity in the range of 3 to 6 PS (at 25° C.).

The prepared coating dispersion was coated on a polyethylene terephthalate permanent support (thickness: 300 μm) horizontally placed on a glass plate. The coated layer was dried to provide an undercoating layer (thickness: 15 μm) on the permanent support.

On the undercoating layer thus formed on the permanent support, the phosphor sheet was placed and then compressed by means of a calendar roll. The compression treatment was sequentially carried out under the conditions as follows: pressure: 500 kgw/cm$^2$; temperature: 75° C. (upper roller) and 25° C. (lower roller); and moving speed: 0.3 m/min. The phosphor sheet was completely fixed on the support by the treatment.

Composition of the Protective Film

| | |
|---|---|
| Fluororesin: Fluoroolefin-vinyi ether copolymer (Lumiflon LF-504x (40 wt.% solution), product of Asahi Glass Co., Ltd.) | 50 g |
| Cross-linking agent: polyisocyanate (Olestar NP38-70s (70 wt. % solution), product of Mitsui Toatsu Chemicals, Inc.) | 9 g |
| Alcohol modified-silicone resin (X-22-2809 (66 wt. % solution), product. of The Shin-Etsu. Chemical Co., Ltd.) | 0.5 g |
| Catalyst: dibutyltin dilaurate (KS1260, product of Kyodo Chemical Co., Ltd.) | 3 mg |

The above composition was dissolved in a mixed solvent of methyl ethyl ketone and cyclohexane (2:8, by volume) to prepare a coating solution of a viscosity in the range of 0.2 to 0.3 PS (at 25° C.). The coating solution was applied on the phosphor layer using a doctor blade, and then heated at 120° C. for 30 minutes to cure and dry the coated layer film. Thus, a protective film (thickness: 3 μm) was formed on the phosphor layer.

Composition of Edge Coating Film

| | |
|---|---|
| Silicone polymer: Polyurethane having a repeating unit of polydimethylcyclohexane (Diaromer SP-3023 (15 wt. % methyl ethyl ketone-toluene mixed solution), product of Dainichiseika Color & Chemicals Mfg. Co., Ltd.) | 70 g |
| Cross-linking agent: polyisocynate (Crossnate D-70 (50 wt. % solution), product of Dainichiseika Color & Chemicals Mfg. Co., Ltd.) | 3 g |
| Anti-yellowing agent: Epoxy resin (EP 1001 (solid), product of Yuka Shell Epoxy Kabushiki Kaisha) | 0.6 g |
| Alcohol modified-silicone (X-22-2809 (66 wt. % solution), product of The Shin-Etsu Chemical Co., Ltd.) | 0.2 g |

The composition was dissolved in 15 g of methyl ethyl ketone to prepare a coating solution for edge coating film.

The solution was coated on the edge (side surface) of the above-formed multi-layered body consisting of the support, the undercoating layer, the phosphor layer and the protective film. Thereafter, the coated solution was well dried to give a hard edge coating film (thickness: 25 μm).

Thus, a radiation image storage panel consisting of the support, the undercoating layer, the phosphor layer, the protective film and the edge coating film was produced.

EXAMPLE 2

The procedures of Example 1 were repeated except that the radical scavenger of hindered amine compound (0.16 g of Mark LA-77) was replaced with a radical scavenger of hindered phenol compound (0.20 g of ADK SIAB A0-70, product of Adeka Argas Chemical Co., Ltd.), to produce a radiation image storage panel consisting of the support, the undercoating layer, the phosphor layer, the protective film and the edge coating film.

EXAMPLE 3

The procedures of Example 1 were repeated except that the radical scavenger of hindered amine compound (0.16 g of Mark LA-77) was replaced with a radical scavenger of hindered amine compound (0.17 g of Sanol LS-765, product of Sankyo CO., Ltd.), to produce a radiation image storage panel consisting of the support, the undercoating layer, the phosphor layer, the protective film and the edge coating film.

EXAMPLE 4

The procedures of Example 1 were repeated except that the phosphor sheet was prepared in the below-mentioned manner, to produce a radiation image storage panel consisting of the support, the undercoating layer, the phosphor layer, the protective film and the edge coating film.

Composition of the Phosphor Sheet (layer)

| | |
|---|---|
| Stimulable phosphor ($BaFBr_{0.85}I_{0.15}:Eu^{2+}$) | 200 g |
| Binder 1: Polyurethane elastomer (P-22 (solid), product of Nippon Miractran Co., Ltd.; Aromatic polyurethane having a repeating unit of dimethylphenylmethane diisocyanate; Vicat softening point: 64° C.) | 8.0 g |
| Anti-yellowing agent:.Epoxy resin (EP 1001 (solid), product of Yuka Shell Epoxy Kablishiki Kaisha) | 2.0 g |
| Radical. scavenger: Hindered amine compound (Mark LA-77, product of Adeka Argas Chemical Co., Ltd.) | 0.16 g |

The composition was placed in tetrahydrofuran and dispersed by means of a propeller mixer to give a coating dispersion of a viscosity of 30 PS (at 25° C.) in which the ratio of binder to phosphor was 1/20. The coating dispersion was coated on a polyethylene terephthalate temporary support (thickness: 150 μm) having silicon release coating. The coated layer was dried to give a stimulable phosphor sheet having a thickness of 150 μm.

COMPARISON EXAMPLE 1

The procedures of Example 1 were repeated except that the radical scavenger was not employed, to produce a radiation image storage panel consisting of the support, the undercoating layer, the phosphor layer, the protective film and the edge coating film.

COMPARISON EXAMPLE 2

The procedures of Example 2 were repeated except that the radical scavenger was not employed, to produce a radiation image storage panel consisting of the support, the undercoating layer, the phosphor layer, the protective film and the edge coating film.

COMPARISON EXAMPLE 3

The procedures of Example 1 were repeated except that the radical scavenger was not employed and an aliphatic polyurethane (T5265H, product of Dainippon Ink & Chemicals, Inc.) was used as a polyurethane elastomer, to produce a radiation image storage panel consisting of the support, the undercoating layer, the phosphor layer, the protective film and the edge coating film.

EVALUATION OF RADIATION IMAGE STORAGE PANEL

With respect to each of the radiation image storage panels prepared in the above examples, durability against both repeated conveying and light was evaluated in the following manner.

1) Durability Against Repeated Conveying

The radiation image storage panel was cut to prepare a rectangular sample piece (100 mm×250 mm). The sample piece was repeatedly transferred in a conveying-durability test machine (shown in U.S. Patent No. 5,641,968) until cracks occurred in the phosphor layer. The durability of the panel against repeated conveying was evaluated by the number of the repetition of the above transferring in the test machine. The results are shown in Table 1.

2) Durability Against Light (light-resistance)

The phosphor layer of the radiation image storage panel was irradiated with the light from a sodium lump at an illuminance of 200,000 lux for 30 hours. Then, the sensitivity of the panel was measured and compared with that having received no irradiation. The reduction ratio of the sensitivity was calculated to evaluate the light-resistance. The results are shown in Table 1.

TABLE 1

| | repeated conveying (repetition number) | light-resistance (reduction ratio) |
|---|---|---|
| Example 1 | 6000 times | 1.5% |
| Example 2 | 6000 times | 2.2% |
| Example 3 | 6000 times | 2.50% |
| Example 4 | 8000 times | 1.8% |
| Com. Example 1 | 6000 times | 12.3% |
| Com. Example 2 | 8000 times | 13.5% |
| Com. Example 3 | 4000 times | 1.8% |

From the results shown in Table 1, it has been confirmed that the radiation image storage panels of the invention exhibit excellent durability against not only repeated conveying but also light.

What is claimed is:

1. A radiation image storage panel having a phosphor layer comprising a stimulable phosphor and a binder, wherein the binder comprises a resin containing a thermoplastic aromatic polyurethane elastomer as a main component, and the phosphor layer contains a radical scavenger in an amount of 0.05 to 10 weight parts per 100 weight of the aromatic polyurethane elastomer.

2. The radiation image storage panel of claim 1, wherein the radical scavenger is a hindered phenol compound or a hindered amine compound.

3. The radiation image storage panel of claim 1, wherein the molecular structure of the thermoplastic polyurethane elastomer contains a repeating unit derived from diphenylmethane diisocyanate.

4. The radiation image storage panel of claim 1, wherein the phosphor layer was prepared by subjecting a formed phosphor layer to compression treatment.

5. The radiation image storage panel of claim 1, wherein the stimulable phosphor is selected from the group consisting of divalent europium activated alkaline earth metal halide phosphors, cerium activated alkaline earth metal halide phosphors, and cerium activated oxyhalide phosphors.

6. The radiation image storage panel of claim 1, wherein the binder polymer and stimulable phosphor are introduced at a ratio in the range of 1:1 to 1:100 (binder:phosphor, by weight).

7. The radiation image storage panel of claim 1, further comprising one or more auxiliary layers selected from the group consisting of an adhesive layer; a light-reflecting layer and a light-absorbing layer.

8. The radiation image storage panel of claim 4, wherein the pressure in the compression treatment is not less than 50 $kgw/cm^2$.

9. The radiation image storage panel of claim 1, further comprising a transparent protective film on the surface of the phosphor layer.

10. The radiation image storage panel of claim 1, wherein the transparent protective film is a transparent polymer having a thickness in the range of 0.1 to 20 $\mu$m.

* * * * *